(12) United States Patent
Banerjee et al.

(10) Patent No.: US 10,264,264 B2
(45) Date of Patent: Apr. 16, 2019

(54) MULTI-BIN DECODING SYSTEMS AND METHODS

(71) Applicant: Apple Inc., Cupertino, CA (US)

(72) Inventors: Abheek Banerjee, Cupertino, CA (US); Syed Muhammad A. Rizvi, San Jose, CA (US); Yaxiong Zhou, Fremont, CA (US); Sorin C. Cismas, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 140 days.

(21) Appl. No.: 15/275,373

(22) Filed: Sep. 24, 2016

(65) Prior Publication Data

US 2018/0091815 A1   Mar. 29, 2018

(51) Int. Cl.

| H04N 19/44  | (2014.01) |
|---|---|
| H04N 19/42  | (2014.01) |
| H04N 19/13  | (2014.01) |
| H04N 19/21  | (2014.01) |
| H04N 19/436 | (2014.01) |
| H04N 19/70  | (2014.01) |
| H04N 19/91  | (2014.01) |

(52) U.S. Cl.
CPC ............ *H04N 19/13* (2014.11); *H04N 19/21* (2014.11); *H04N 19/42* (2014.11); *H04N 19/436* (2014.11); *H04N 19/44* (2014.11); *H04N 19/70* (2014.11); *H04N 19/91* (2014.11)

(58) Field of Classification Search
CPC .............................. H04N 19/13; H04N 19/436
See application file for complete search history.

(56) References Cited

U.S. PATENT DOCUMENTS

| 5,583,500 | A  | * | 12/1996 | Allen    | H03M 7/4006 341/107 |
|---|---|---|---|---|---|
| 5,717,394 | A  | * | 2/1998  | Schwartz | H03M 7/4006 341/107 |
| 7,688,895 | B2 | * | 3/2010  | Winger   | H04N 19/15 375/240.23 |
| 8,422,803 | B2 | * | 4/2013  | Sekiguchi | H04N 19/176 382/233 |
| 8,891,616 | B1 | * | 11/2014 | Wilkins  | H04N 19/13 375/240.03 |
| 8,989,265 | B2 | * | 3/2015  | Jeon     | H04N 19/105 375/240.12 |
| 9,503,717 | B2 | * | 11/2016 | Sze      | H04N 19/91 |
| 9,584,802 | B2 | * | 2/2017  | Sze      | H04N 19/91 |
| 10,009,606 | B2 | * | 6/2018 | Bulusu   | H04N 19/13 |

(Continued)

OTHER PUBLICATIONS

Zhao, Yijin, et al.: "A 610 MBIN/S CABAC Decoder for 8265/HEVC Level 6.1 Applications", IEEE International Conference on Image Processing, Oct. 27, 2014, pp. 1268-1272 (XP032966794).

(Continued)

*Primary Examiner* — Jayanti K Patel
*Assistant Examiner* — Irfan Habib
(74) *Attorney, Agent, or Firm* — Fletcher Yoder, P.C.

(57) ABSTRACT

Systems and methods for improving decoding of encoded image data using parallel multi-bin decoding are provided. In one embodiment, multiple context bins per cycle are decoded for a set of syntax elements, by decoupling and/or retiming particular syntax parsing and/or arithmetic decoding tasks of the decoding process.

20 Claims, 9 Drawing Sheets

(56) References Cited

U.S. PATENT DOCUMENTS

| | | | | |
|---|---|---|---|---|
| 2005/0012648 A1* | 1/2005 | Marpe | ............... | H03M 7/4006 341/107 |
| 2006/0126744 A1* | 6/2006 | Peng | ............... | H03M 7/4006 375/240.26 |
| 2007/0183491 A1* | 8/2007 | Pearson | ............... | H03M 7/4006 375/240 |
| 2008/0276078 A1* | 11/2008 | Hu | ............... | H04N 19/176 712/223 |
| 2009/0058695 A1* | 3/2009 | Bao | ............... | H03M 7/4006 341/107 |
| 2009/0096643 A1* | 4/2009 | Chang | ............... | H03M 7/4006 341/51 |
| 2010/0097250 A1* | 4/2010 | Demircin | ............... | H03M 7/4006 341/107 |
| 2010/0127904 A1* | 5/2010 | Oxman | ............... | H03M 7/40 341/107 |
| 2010/0134330 A1* | 6/2010 | Sakaguchi | ............... | H03M 7/4006 341/51 |
| 2010/0238056 A1* | 9/2010 | Seki | ............... | H04N 19/176 341/107 |
| 2011/0310958 A1* | 12/2011 | Sachdeva | ............... | H04N 19/91 375/240.02 |
| 2012/0014431 A1* | 1/2012 | Zhao | ............... | H04N 19/70 375/240.02 |
| 2012/0082215 A1* | 4/2012 | Sze | ............... | H04N 19/13 375/240.03 |
| 2012/0082218 A1* | 4/2012 | Misra | ............... | H04N 19/197 375/240.12 |
| 2012/0140813 A1* | 6/2012 | Sole Rojals | ............... | H03M 7/4018 375/240.02 |
| 2012/0183235 A1* | 7/2012 | Sasai | ............... | H03M 7/4018 382/233 |
| 2012/0300839 A1* | 11/2012 | Sze | ............... | H04N 19/91 375/240.12 |
| 2012/0328026 A1* | 12/2012 | Sole Rojals | ............... | H03M 7/6023 375/240.18 |
| 2013/0003827 A1* | 1/2013 | Misra | ............... | H04N 19/159 375/240.12 |
| 2013/0003829 A1* | 1/2013 | Misra | ............... | H04N 19/91 375/240.12 |
| 2013/0003830 A1* | 1/2013 | Misra | ............... | H04N 19/159 375/240.12 |
| 2013/0027230 A1* | 1/2013 | Marpe | ............... | H03M 7/4006 341/107 |
| 2013/0028334 A1* | 1/2013 | Bossen | ............... | H03M 7/4018 375/240.25 |
| 2013/0114693 A1* | 5/2013 | Gao | ............... | H04N 19/593 375/240.03 |
| 2013/0177069 A1* | 7/2013 | Sze | ............... | H04N 19/91 375/240.02 |
| 2013/0272377 A1* | 10/2013 | Karczewicz | ............... | H03M 7/30 375/240.02 |
| 2013/0272389 A1* | 10/2013 | Sze | ............... | H04N 19/91 375/240.03 |
| 2013/0322774 A1* | 12/2013 | Sasai | ............... | G06T 9/00 382/239 |
| 2014/0140400 A1* | 5/2014 | George | ............... | H04N 19/52 375/240.12 |
| 2017/0127064 A1* | 5/2017 | Sze | ............... | H04N 19/91 |
| 2017/0155909 A1* | 6/2017 | Sze | ............... | H04N 19/91 |
| 2017/0250709 A1* | 8/2017 | George | ............... | H04N 19/52 |

OTHER PUBLICATIONS

Bong-Hee Bae, "A Design of Pipeline-Parallel CABAC Decoder Adaptive to HEVC Syntax Elements," IEEE International Symposium on Consumer Electronics, Jun. 22, 2014 pp. 1-2 (XP032631064).

V. Sze: "Context Selection Complexity in HEVC CABAD", MPEG Meeting; Jan. 24-28, 2011; (Motion Picture Expert Group or ISO/IEC JTCI/SC29/GB11); No. M19005, Jan. 22, 2011, 3 pgs. (XP030047573).

Pin-Chih Lin et al.: "A Branch Selection Multi-symbol High Throughput CABAC Decoder Architecture for H.264/AVC," IEEE International Symposium on Circuits and Systems, May 24, 2009; pp. 365-368 (XP031479203_.

Vivienne Sze et al.: "Parallel CABAC for Low Power Video Coding", IEEE International Conference on Image Processing, Oct. 12, 2008; pp. 2096-2099 (XP031374447).

Yu-Hsin Chen et al.: "A 214 MBIN/S Deeply Pipelined CABAC Decoder for HEVC", 2014 IEEE International Conference on Image Processing, Oct. 27, 2104, pp. 2110-2114 (XP032966964).

Yahya Jan, et al.: "Survey of Advanced CABAC Accelerator Architectures for Future Multimedia", Mar. 16, 2009, Network and Parallel Computing; [Lecture Notes in Computer Science; Lecture Notes in Computer], Springer International Publishing, pp. 342-248 (XP047392077).

Invitation to Pay Additional Fees / Partial International Search for PCT Application No. PCT/US2017/042154 dated Sep. 25, 2017, 16 pgs.

Flynn, David et al.; High Efficiency Video Coding (HEVC) Range Extensions Text Specification: Draft 7; Joint Collaborative Team on Video Coding (JCT-VC) of ITU-T SG 16 WP 3 and ISO/IEC JTC 1/SC 29/WG 11 17th Meeting; Mar. 27-Apr. 4, 2014; Document JCTVC-Q1005_v9.

Boyce, Jill (Vidyo); Draft High Efficiency Video Coding (HEVC) Version 2, Combined Format Range Extensions (RExt), Scalability (SHVC), and Mult-View (MV-HEVC) Extensions; Joint Collaborative Team on Video Coding (JCT-VC) of ITU-T SG 16 WP 3 and ISO/IEC JTC 1/SC 29/WG 11 18th Meeting; Jun. 30-Jul. 9, 2014; Document JCTVC-R1013_v3.

\* cited by examiner

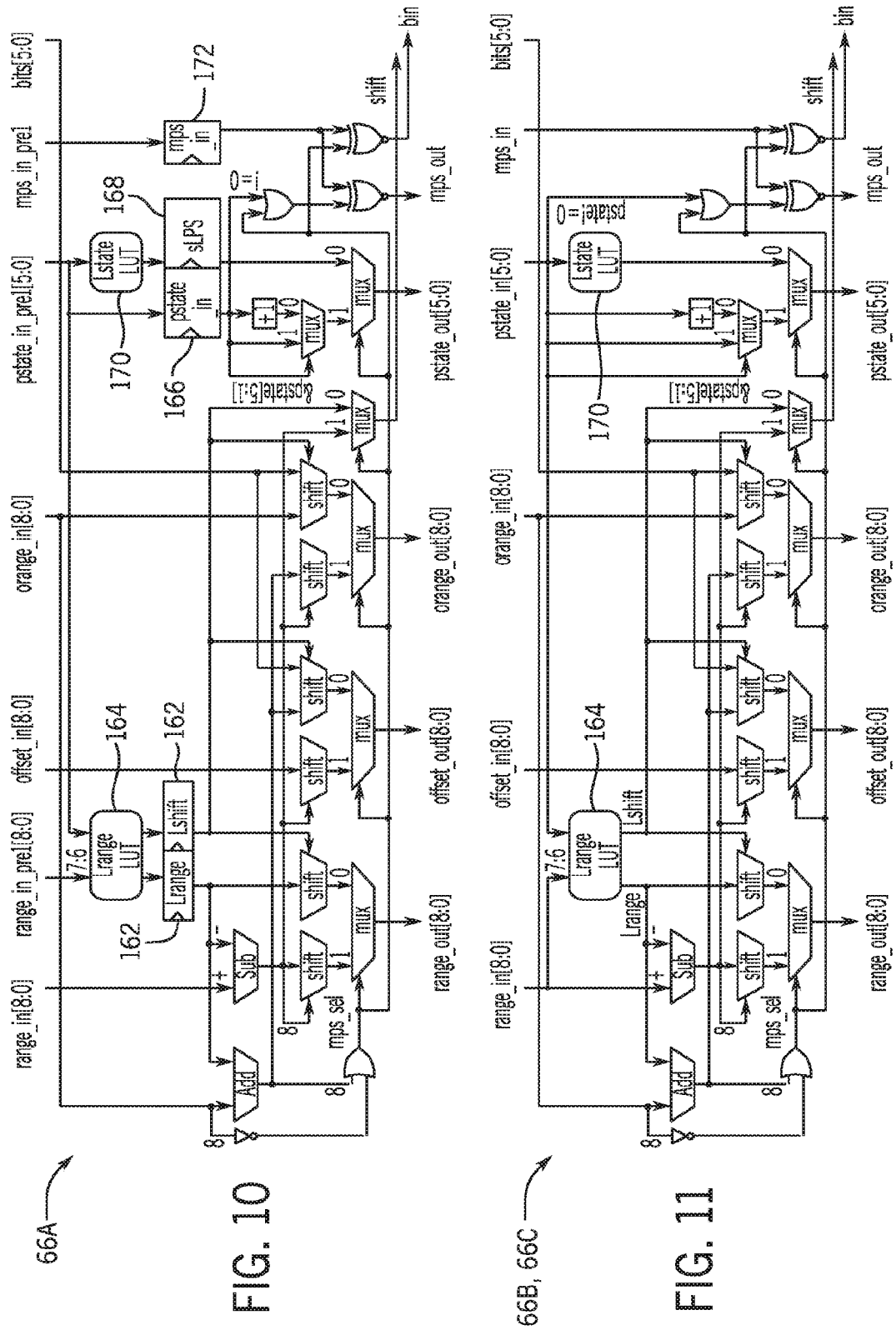

MULTI-BIN DECODING SYSTEMS AND METHODS

BACKGROUND

The present disclosure relates generally to image data decoding and, more particularly, to decoding image data by decoding multiple bins in parallel.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual representations of information as text, still images, and/or video by displaying one or more image frames based on image data. For example, such electronic devices may include computers, mobile phones, portable media devices, tablets, televisions, virtual-reality headsets, and vehicle dashboards, among many others. Since image data may be received from another electronic device and/or stored in the electronic device, the image data may be encoded (e.g., compressed) to reduce size (e.g., number of bits) and, thus, resources (e.g., transmission bandwidth and/or memory addresses) used to transmit and/or store image data. To display image frames, the electronic device may decode encoded image data and instruct the electronic display to adjust luminance of display pixels based on the decoded image data.

To facilitate encoding, a prediction encoding process may be used to compress image data. For example, a prediction encoding process may compress a portion of the image data by referencing another portion of the image data, thereby generating prediction encoded image data including symbols (e.g., syntax elements) that indicate the relationship between the portions of the image data. Additionally, an entropy encoding process may compress the prediction encoded image data by indicating the symbols based on frequency of occurrence in the prediction encoded image data. In this manner, the entropy encoding process may further compress the image data by generating entropy encoded image data that indicates more frequently occurring symbols using fewer bits.

The encoded image data is often includes high-quality, high-resolution video streams that are encoded via a particular standard (e.g., High Efficiency Video Coding (HEVC) (H.265)). The current discussion specifically refers to the HEVC standard, as referenced in the documents titled, "High Efficiency Video Coding (HEVC) Range Extensions text specification: Draft 7" and "Draft high efficiency video coding (HEVC) version 2, combined format range extensions (RExt), scalability (SHVC), and multi-view (MV-HEVC) extensions," which are incorporated herein in their entirety. However, this is not intended to limit the scope to HEVC applications. Indeed, the techniques discussed herein may apply to other encoding standards.

To decode the encoded image data quickly enough for display at high frame rates, special-purpose hardware decoders may be implemented as integrated logic circuits. HEVC bitstream decoding involves entropy decoding of the bits followed by parsing of syntax elements. The challenge to achieving the above requirement comes from two aspects of the HEVC bitstream that limit opportunities for parallelization of the decode process.

First, the HEVC bitstream has embedded control information that governs the flow of the parsing process. Hence the results of decoding one syntax element govern which syntax element will be decoded next.

Second, the HEVC bitstream is arithmetically coded. Thus the HEVC bitstream undergoes an arithmetic decoding process. Arithmetic decoding is an inherently bit-serial computation process, where the results of decoding one bin impact how the next bin will be decoded. For example, HEVC arithmetic decoding involves decoding of: i. Context adaptive binary arithmetic coded (CABAC) bins, ii. Bypass coded bins, and iii. bitstream terminate bins.

The results of the parsing process impact the arithmetic decoding process, and vice versa. In other words, the parsing process and the arithmetic decoding process are interdependent. This interdependency results in added complexity to the decoding process.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to improving decoding speed for encoded content streams, for example, by increasing the clock frequency at which the logic circuit can operate given a certain goal of average bins per cycle to decode. In one embodiment, parallelism may be implemented between portions of the parsing process and portions of the arithmetic decoding process, in spite of their inter-dependencies.

In particular, in some embodiments, parallelism may be introduced by implementing parallel decoding for one or more particular syntax elements. For example, multiple context bins for a set of most frequently observed syntax elements may be decoded per clock cycle, while decoding of context bins for other, less frequently occurring, syntax elements may be decoded once per cycle. This arrangement may act to balance processing speed of the decoding and area usage for the parallel decoding logic.

Further, context buffer lookups associated with the multi-context bin processing may be efficiently timed to allow for pre-processing prior to a given clock cycle. For example, in some embodiments, certain processing may be timed to a clock cycle prior to the cycle in which the bin decoding occurs, enabling processing data to be available earlier in the decoding process.

BRIEF DESCRIPTION OF THE DRAWINGS

Various aspects of this disclosure may be better understood upon reading the following detailed description and upon reference to the drawings in which:

FIG. 10 is a block diagram illustrating details of the first context bin decoder of FIG. 9, in accordance with an embodiment of the present disclosure;

FIG. 11 is a block diagram illustrating details of the second and third context bin decoders of FIG. 9, in accordance with an embodiment of the present disclosure.

DETAILED DESCRIPTION

Figure 1:
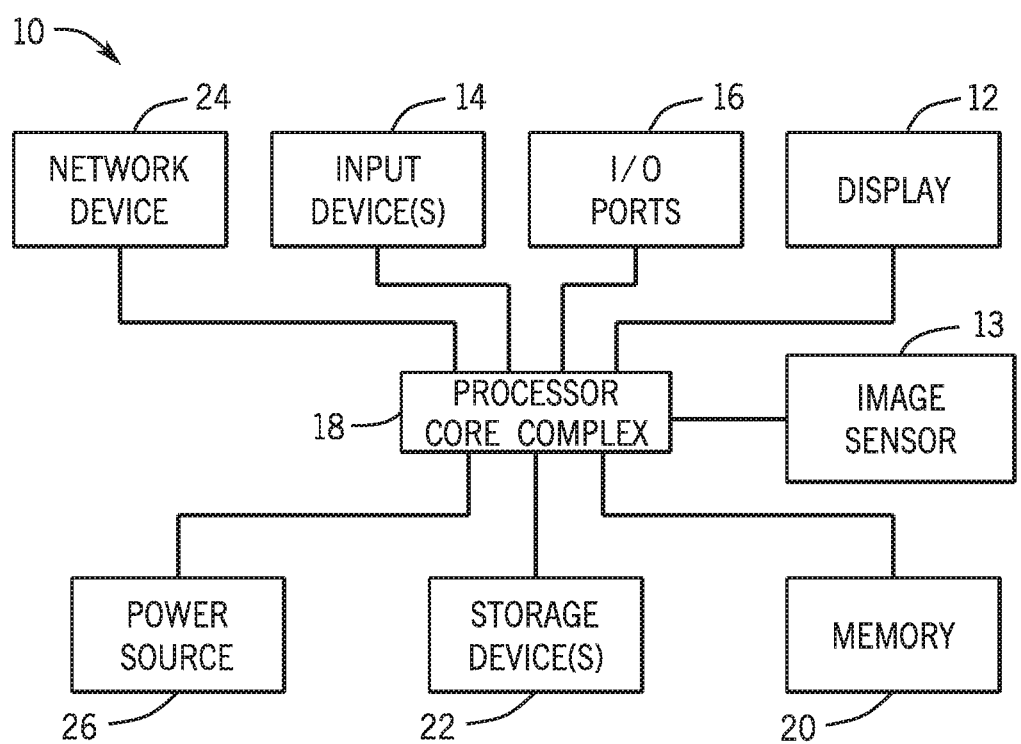
FIG. 1 is a block diagram of an electronic device used encode and/or decode image data, in accordance with an embodiment of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Generally, an electronic device may facilitate visually presenting information by instructing an electronic display to display image frames based on image data. In some instances, the image data may be generated by an image sensor (e.g., digital camera) and stored in the electronic device. Additionally, when the image data is generated external from the electronic device, the image data may be transmitted to the electronic device. As such, usage, image data may be encoded (e.g., compressed) to reduce size (e.g., number of bits), thereby improving data storage efficiency and/or data transmission efficiency.

In some instances, image data may be prediction encoded and, subsequently, entropy encoded. For example, since an image frame may change gradually, an intra-frame prediction encoding process may indicate image data of a first portion of the image frame by referencing image data of a second portion of the image frame. Additionally, since successively displayed image frames may change gradually, an inter-frame prediction encoding process may indicate image data in an image frame with reference to image data in one or more other image frames. In this manner, instead of directly compressing the image data, the prediction encoding process may generate prediction encoded image data prediction encoded image data including symbols (e.g., syntax elements) that indicate the relationship between the portions of the image data.

Additionally, an entropy encoding process may compress the prediction encoded image data based at least in part on probability of symbols occurring in the prediction encoded image data. For example, symbols that occur more frequently may be indicated using fewer bits compared to symbols that occur less frequently. In this manner, the entropy encoding process may generate entropy encoded image data, which may then be stored and/or transmitted.

In some instances, image data may be captured for real-time or near real-time display and/or transmission. As such, the ability to display and/or transmit in real-time or near real-time may be dependent at least in part on a decoding rate of the encoded image data. However, in some instances, image data decoding may use extensive processing time. For example, the critical paths of the decoding pipeline may reduce the decoding throughput, especially considering the interdependent relationship between the syntax element parsing and bin decoding processes. Thus, the image data decoding process may present a bottleneck that limits output rate of a presented image data, which may affect ability to display the image data in real-time or near real-time.

Accordingly, the present disclosure provides techniques to improve throughput of an entropy decoding process, for example, to facilitate real-time or near real-time display of image data. To facilitate improved throughput, in some embodiments, the decoding process may be implemented by decoupling the syntax element parsing and arithmetic decoding of context bins, such that parallel processing may occur.

In this manner, the techniques described herein may facilitate improving output rate of decoded image data by improving throughput of a decoding pipeline.

To help illustrate, an electronic device 10 that may utilize an electronic display 12 to display image frames based on image data and/or utilize an image sensor 13 to capture image data is shown in FIG. 1. As will be described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in an electronic device 10.

In the depicted embodiment, the electronic device 10 includes the electronic display 12, the image sensor 13, one or more input devices 14, one or more input/output (I/O)

ports 16, a processor core complex 18 having one or more processor(s) or processor cores, local memory 20, a main memory storage device 22, a network interface 24, and a power source 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component.

As depicted, the processor core complex 18 is operably coupled with local memory 20 and the main memory storage device 22. Thus, the processor core complex 18 may execute instruction stored in local memory 20 and/or the main memory storage device 22 to perform operations, such as encoding image data captured by the image sensor 13 and/or decoding image data for display on the electronic display 12. As such, the processor core complex 18 may include one or more general purpose microprocessors, one or more application specific processors (ASICs), one or more field programmable logic arrays (FPGAs), or any combination thereof.

In addition to instructions, the local memory 20 and/or the main memory storage device 22 may store data to be processed by the processor core complex 18. Thus, in some embodiments, the local memory 20 and/or the main memory storage device 22 may include one or more tangible, non-transitory, computer-readable mediums. For example, the local memory 20 may include random access memory (RAM) and the main memory storage device 22 may include read only memory (ROM), rewritable non-volatile memory such as flash memory, hard drives, optical discs, and/or the like.

As depicted, the processor core complex 18 is also operably coupled with the network interface 24. In some embodiments, the network interface 24 may facilitate communicating data with another electronic device and/or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the electronic device 10 to transmit encoded image data to a network and/or receive encoded image data from the network for display on the electronic display 12.

Additionally, as depicted, the processor core complex 18 is operably coupled to the power source 26. In some embodiments, the power source 26 may provide electrical power to one or more component in the electronic device 10, such as the processor core complex 18 and/or the electronic display 12. Thus, the power source 26 may include any suitable source of energy, such as a rechargeable lithium polymer (Li-poly) battery and/or an alternating current (AC) power converter.

Furthermore, as depicted, the processor core complex 18 is operably coupled with the one or more I/O ports 16. In some embodiments, an I/O ports 16 may enable the electronic device 10 to interface with other electronic devices. For example, when a portable storage device is connected, the I/O port 16 may enable the processor core complex 18 to communicate data with the portable storage device. In this manner, the I/O ports 16 may enable the electronic device 10 to output encoded image data to the portable storage device and/or receive encoded image data from the portable storage device.

As depicted, the electronic device 10 is also operably coupled with the one or more input devices 14. In some embodiments, an input device 14 may facilitate user interaction with the electronic device 10, for example, by receiving user inputs. Thus, an input device 14 may include a button, a keyboard, a mouse, a trackpad, and/or the like. Additionally, in some embodiments, an input device 14 may include touch-sensing components in the electronic display 12. In such embodiments, the touch sensing components may receive user inputs by detecting occurrence and/or position of an object touching the surface of the electronic display 12.

In addition to enabling user inputs, the electronic display 12 may include a display panel with one or more display pixels. As described above, the electronic display 12 may control light emission from the display pixels to present visual representations of information, such as a graphical user interface (GUI) of an operating system, an application interface, a still image, or video content, by displaying image frames based at least in part on corresponding image data. In some embodiments, the image data may be received from other electronic devices 10, for example, via the network interface 24 and/or the I/O ports 16. Additionally or alternatively, the image data may be generated by electronic device 10, for example, based on visual representations of proximate physical features captured by the image sensor 13.

To facilitate improving data storage and/or data communication efficiency, the image data may be encoded (e.g., compressed), for example, by the electronic device 10 that generated the image data. Once generated or received, the encoded image data may be stored in local memory 20. Accordingly, to display a corresponding image frame, the processor core complex 18 may retrieve encoded image data from local memory 20, decode the encoded image data, and instruct the electronic display 12 to display the image frame based on the decoded image data.

Figure 2:
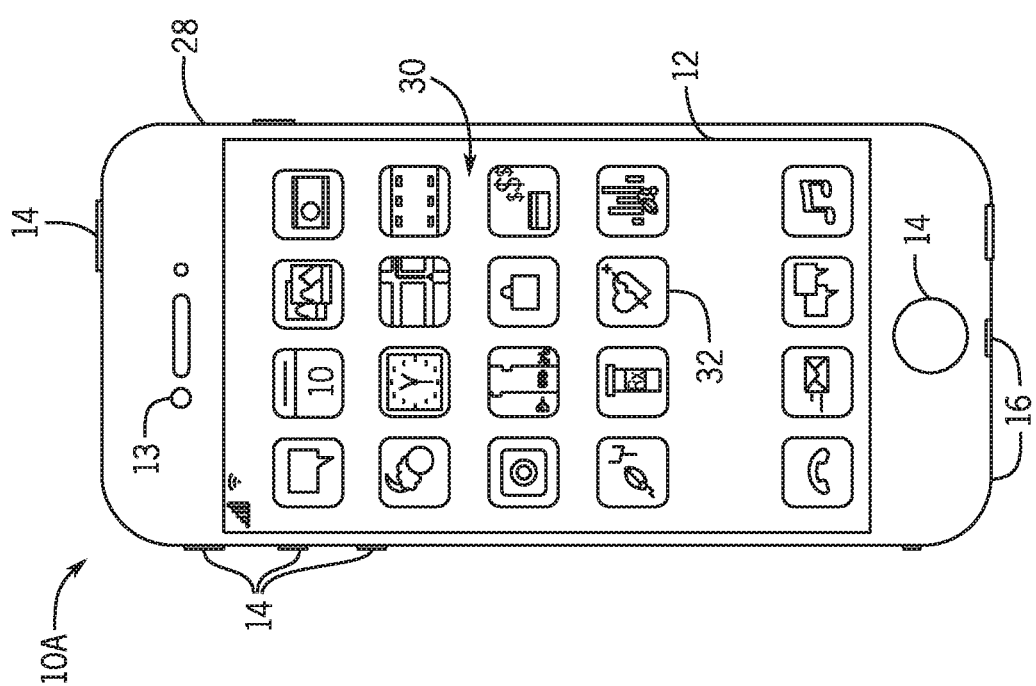
FIG. 2 is one example of the electronic device of FIG. 1, in accordance with an embodiment of the present disclosure.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smart phone, such as any iPhone® model available from Apple Inc.

As depicted, the handheld device 10A includes an enclosure 28 (e.g., housing). In some embodiments, the enclosure 28 may protect interior components from physical damage and/or shield them from electromagnetic interference. Additionally, as depicted, the enclosure 28 surrounds the electronic display 12. In the depicted embodiment, the electronic display 12 is displaying a graphical user interface (GUI) 30 having an array of icons 32. By way of example, when an icon 32 is selected either by an input device 14 or a touch-sensing component of the electronic display 12, an application program may launch.

Furthermore, as depicted, input devices 14 open through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voicerecognition feature, provide volume control, and/or toggle between vibrate and ring modes. As depicted, the I/O ports 16 also open through the enclosure 28. In some embodiments, the I/O ports 16 may include, for example, an audio jack to connect to external devices.

Figure 3:
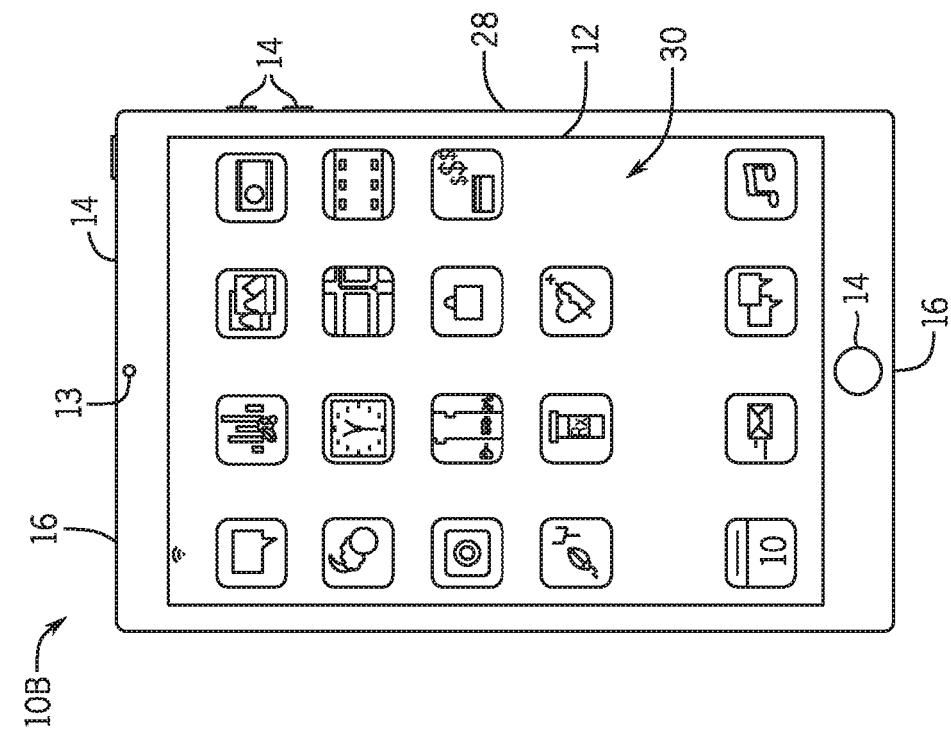
FIG. 3 is another example of the electronic device of FIG. 1, in accordance with an embodiment of the present disclosure.
Figure 4:
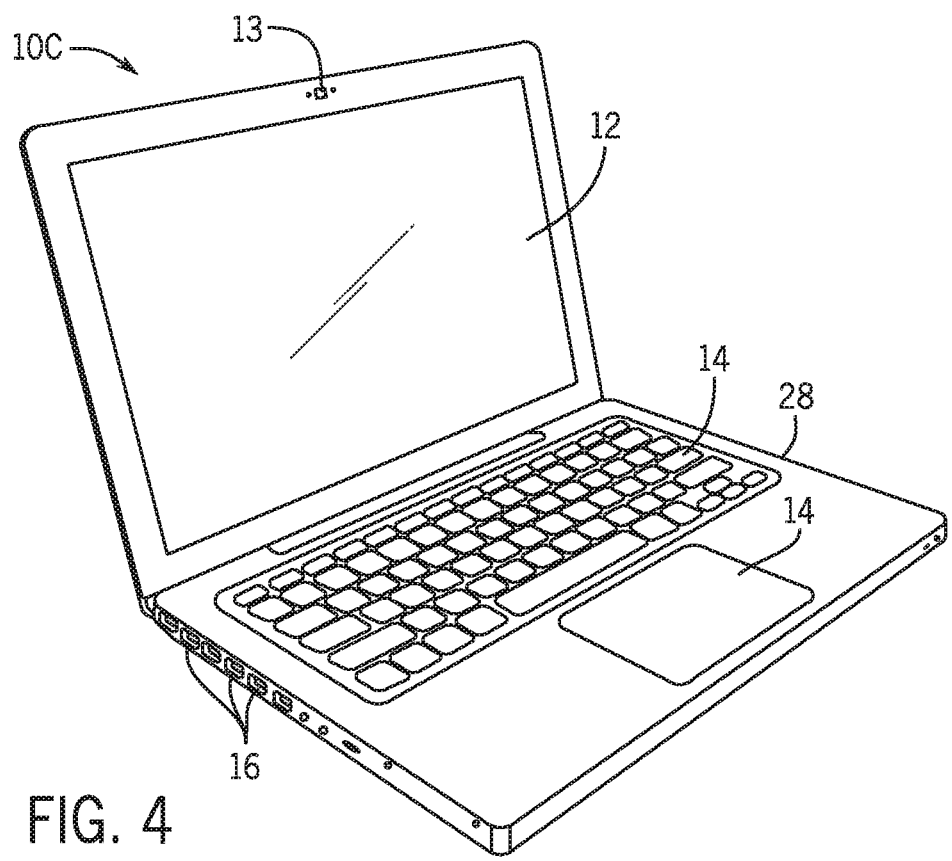
FIG. 4 is another example of the electronic device of FIG. 1, in accordance with an embodiment of the present disclosure.
Figure 5:
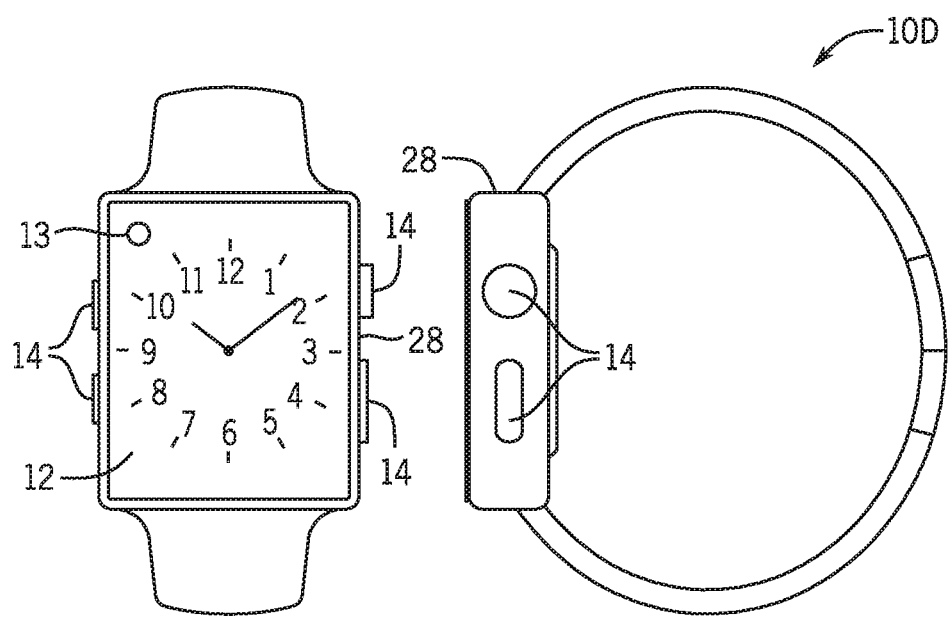
FIG. 5 is another example of the electronic device of FIG. 1, in accordance with an embodiment of the present disclosure.

To further illustrate, another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any Macbook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 28.

As described above, image data may be encoded (e.g., compressed) to facilitate reducing resource (e.g., storage and/or communication) usage. Additionally, to facilitate real-time or near real-time display and/or transmission, duration between generation of image data and display of image frames based on the image data may be limited. For example, image data captured by the image sensor 13 may be displayed on the electronic display 12 with minimal delay to enable a user to determine physical features proximate the image sensor 13 in real-time or near real-time. Additionally, image data generated by the electronic device 10 may be transmitted (e.g., broadcast) to one or more other electronic devices 10 to enable a real-time or near real-time streaming. As such, duration available to decode image data may be limited—particularly as resolution of image frames increases and/or refresh rate of electronic displays 12 increases.

Figure 6:
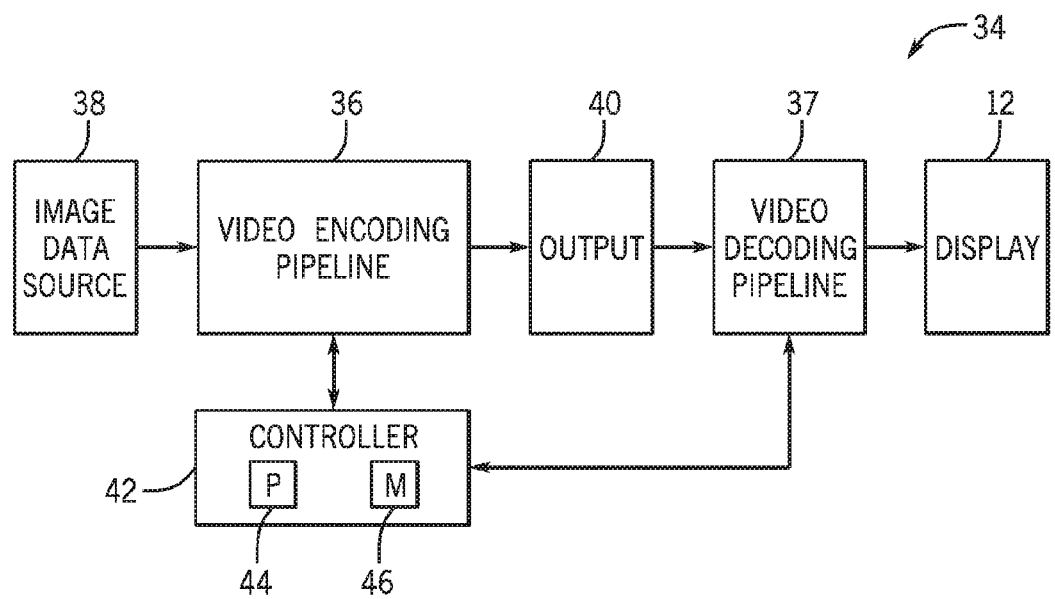
FIG. 6 is block diagram of a system that includes video encoding and decoding pipelines, in accordance with an embodiment of the present disclosure.

To help illustrate, one embodiment of a portion 34 of an electronic device 10 including a video encoding pipeline 36 that may be used to encode image data is shown in FIG. 6. Further, a video decoding pipeline 37 may be used to decode the encoded image data. In some embodiments, at least a portion of the video encoding pipeline 36 and/or the video decoding pipeline 37 may be implemented by executing instructions stored in a tangible, non-transitory, computer-readable medium using the processor core complex 18 and/or one or more other processing units. Additionally, in some embodiments, at least a portion of the video encoding pipeline 36 and/or the video decoding pipeline 37 may be implemented based on circuit connections formed in processing circuitry.

As depicted, the portion 34 of the electronic device 10 also includes an image data source 38, an output device 40, and a controller 42. In some embodiments, the controller 42 may control operation of the video encoding pipeline 36, the video decoding pipeline 37, the image data source 38, and/or the output device 40. Further, in some embodiments, additional controllers 42 may be used to control operation of the system components (e.g., a first controller 42 that controls the video encoding pipeline 36 and a second controller 42 that controls the video decoding pipeline 37). To facilitate controlling operation, the controller 42 may include a controller processor 44 and controller memory 46. In some embodiments, the controller processor 44 may execute instructions stored in the controller memory 46. Thus, in some embodiments, the controller processor 44 may be included in the processor core complex 18 and/or one or more other processing units. Additionally, in some embodiments, the controller memory 46 may be included in the local memory 20, the main memory storage device 22, a separate tangible, non-transitory, computer readable medium, or any combination thereof.

In the depicted embodiment, the video encoding pipeline 36 is communicatively coupled to the image data source 38. In this manner, the video encoding pipeline 36 may receive source image data from the image data source 38. Thus, in some embodiments, the image data source 38 may be the image sensor 13 and/or any other suitable device that generates source image data.

Additionally, in the depicted embodiment, the video encoding pipeline 36 is communicatively coupled to the output device 40. In this manner, the video encoding pipeline 36 may output encoded (e.g., compressed) image data to the output device 40, for example, for storage and/or transmission. Thus, in some embodiments, the output device 40 may include the local memory 20, the main memory storage device 22, the network interface 24, the I/O ports 16, the controller memory 46, or any combination thereof.

To facilitate decoding encoded image data, the encoded image data may be provided by and/or sourced from the output 40. For example, the encoded image data may be communicated to the video decoding pipeline 37 via a storage device and/or a communication network. The video decoding pipeline 37 may decode the encoded image data and provide the decoded image data to the display 12 for presentation.

As described above, data storage efficiency and/or data communication efficiency may be further improved by entropy encoding the symbols (e.g., syntax elements). To facilitate entropy encoding, in some embodiments, the video encoding pipeline 36 may binarize the symbols (e.g., by mapping the symbol to a corresponding binary representation, which includes one or more bins (e.g., "0" or "1")). In this manner, the video encoding pipeline 36 may generate a bin stream, which may be entropy encoded.

The video encoding pipeline 36 may store the bin stream in an external storage device, such as the controller memory 46, via write direct memory access (DMA) and may retrieve the bin stream from the external storage device, for example, via read directly memory access. In this manner, the video encoding pipeline 36 may determine and entropy encode the bin stream to determine a bit stream supplied to an output device 40, such as the external storage device, a decoding device (e.g., that includes a video decoding pipeline 37), and/or a communication network.

Figure 7:
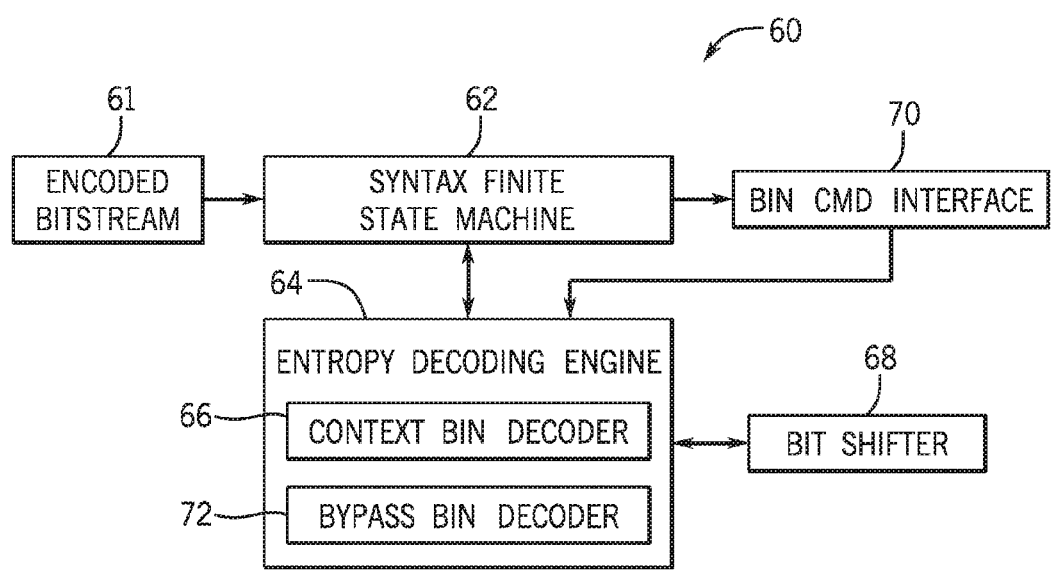
FIG. 7 is a block diagram illustrating features of a logic circuit that parses an encoded bitstream, in accordance with an embodiment of the present disclosure.

Turning now to a more detailed discussion of the decoding process, FIG. 7 is a block diagram illustrating features of a logic circuit 60 that parses an encoded bitstream 61, in accordance with an embodiment of the present disclosure. The logic circuit 60 that parses an encoded bitstream (e.g., to reconstruct pictures on display 12) may be partitioned into various blocks. In the current embodiment, four major blocks exists. In particular the logic circuit 60 includes a syntax finite sate machine (syntax FSM) 62, an entropy decoding engine 64 with a context bin decoder 66, a bit shifter 68, and a bin command interface 70.

The syntax FSM 62 traverses through the encoded bitstream 61, including the various syntax elements (e.g. as described by slice_segment_data( ) in section 7.3.8 of the HEVC standard) that are Binary Arithmetic Coded (BAC). The syntax FSM 62 controls syntax element parsing of the decoding process. The syntax FSM 62 is aware of whether the BAC-encoded bins to be decoded are context-adaptive binary arithmetcally coded (CABAC), terminate-coded, or bypass-coded. For CABAC encoded bins, the syntax FSM 62 is aware of the mapping of each possible context to some unique numerical indices. In particular, the syntax FSM 62 has a state for every possible context-adaptive bin that it may need to parse. The syntax FSM 62 may drive the corresponding numerical context index to the entropy decoding engine 64 and receive back a decoded bin value back in the same clock cycle. In some embodiments, these potential context indices then get muxed down to a single context index based on the state.

The entropy decoding engine 64 assists the syntax FSM 62 in decoding the BAC-encoded bins, with an example throughput of 1 bin per cycle during a string of context bins. The decoding of a bin in the CABAC subset of BAC-encoded bins, may be implemented by the context bin decoder 66 of the entropy decoding engine 64. The context bin decoder 66 receives the context index specified by the syntax FSM 62 and looks up a context buffer (e.g., a 173-entry context buffer initialized at the beginning of each tile or independent slice, based on the slice type) to get the Most Probable Symbol (MPS, which may be 1-bit) and the Least Probable Symbol Probability State (LPS PSTATE, which may be 6-bit) for that bin. As mentioned above, the context buffer may include 173 entries. The 173 entries come from Tables 9-5 through 9-37 of the HEVC standard. In one embodiment, this lookup would be done in the previous cycle using 1-cycle-early versions of the syntax FSM 62 state, when the context buffer is implemented using a synchronous memory macro. In an alternative embodiment, if the context buffer is implemented using registers and/or an asynchronous-read memory macro, the lookup may be done at the beginning of the current cycle.

Then, the context bin decoder 66 performs a look up on the Least Probable Symbol Range Table (rangeTabLps, e.g., as defined in table 9-46 of the HEVC standard) using the LPS PSTATE as a index, subtracts the resulting range of the least probable symbol (ivlLpsRange) from the prior variable specifying the range of the arithmetic coding range (old ivlCurrRange), and shifts a variable number of bits out from the bit shifter 68, which loads the bits into the new value (ivlOffset), depending on the result.

The entropy decoding engine 64 also contains a bypass bin decoder 72 path in parallel with the context bin decoder 66 path, in which one or more bypass bins are decoded in a single cycle. The updated ivlCurrRange and ivlOffset, as well as the number of bits to shift out of the bit shifter 68, may be muxed between these paths based on a control signal from the syntax FSM 62, as mentioned in the discussion of the bin command interface 70, detailed below.

The context bin decoder 66 is also responsible for updating the same context that it read, based on the result of the bin decode, such that another context bin decode in the next cycle of a bin belonging to the same context, sees the updated MPS and LPS PSTATE.

The bit shifter 68 consisting of a certain number of flip-flops which acts as a FIFO, shifting in bytes of bitstream data on one side (which have any start code emulation prevention bytes already removed by upstream logic), and shifting out bits on the other side as requested by the entropy decoding engine 64 or directly requested by the syntax FSM 62, in the case of non-BAC-encoded information such as PCM samples). The bit shifter 68 maintains a count of how many of its bits are valid (e.g., how many bits have been shifted in by the upstream logic, but not shifted out yet). The bit locations at which to load new byte(s) from the upstream (as space permits in the given number of flip-flops), depend on the shift-out amount from the same clock cycle.

The bin command interface 70 on which the syntax FSM 62 outputs to the entropy decoding engine 64 a "valid" strobe, along with several data fields that are combinational functions of the overall state of the syntax FSM 62. These data fields include indications of whether the bin(s) to be decoded in that clock cycle are context-adaptively coded, terminate-coded, or bypass-coded; if context-adaptively coded, what the numerical context index is; and if bypass-coded, how many bins to decode. The bin command interface 70 is a Valid/Ready interface in which the syntax FSM 62 only asserts Valid if it is working on BAC-encoded portions of the bitstream, and the entropy decoding engine 64 asserts Ready if the bit shifter 68 contains enough bits to complete the command of the given type and context index. The syntax FSM 62 advances to its next state when the aforementioned Valid and Ready are both asserted. In addition to the Ready signal, the entropy decoding engine 64 returns decoded bin values to the syntax FSM 62. The syntax FSM 62 uses these bin values for its state transition, and also debinarizes the syntax elements into a straightforward fixed-length format to push to a downstream pipeline for frame reconstruction.

As mentioned above, the decoding logic circuit 60 may be enhanced to provide decoding at a higher rate of bits per second at the same clock frequency. For example, as will be discussed in more detail below, in one embodiment, through logic replication, multiple context bins may be decoded per clock cycle. In some embodiments, such functionality may be reserved for certain particular syntax elements to reduce area used by the replicated logic. For example, the multiple context bins per cycle decoding may be reserved for the most frequently occurring syntax elements found in typical video streams. In some embodiments, out of the 39 CABAC-encoded syntax elements listed in Table 9-4 of the HEVC standard, the last_sig_coeff_x_prefix, last_sig_coeff_y_prefix, coeef_abs_level_greater1_flag, and sig_coeff_flag may be observed as occurring most frequently and/or occurring in "runs" of multiple consecutive bins of the same syntax element. In the HEVC standard, syntax element last_sig_coeff_x_prefix specifies the prefix of the column position of the last significant coefficient in a scanning order within a transform block. Further, last_sig_coeff_y_prefix specifies the prefix of the row position of the last significant coefficient in a scanning order within the transform block. Further, the coeff_abs_level_greater1_flag indicates, for each non-zero coefficient, whether the coefficient value is larger than 1. Additionally, the sig_coeff_flag indicates the significance (e.g., 0 or 1) of coefficients. Accordingly, the syntax FSM 62 and the entropy decoding engine 64 may replicate logic for just these syntax elements, resulting in increased throughput of bitstream parsing, which incurring a significant increase to the logic area.

Further, the bitstream parsing could additionally enhanced by modifying the bin command interface 70 to include a number of bins to be decoded (e.g., from 1 to C) and C context indices. In such an embodiment, C bin values are returned from the entropy decoding engine 64 to the syntax FSM 62. The logic in the state machines would drive proper values for as many context indices indicated by the bin count and would consume as many bin values as indicated by the bin count.

Within the entropy decoding engine 64, in one path, a multi-bypass bin decoder 72 is placed. Further, in another path, C context bin decoders 66 chained together, where the updated ivlCurrRange, ivlOffset, and bit-shift amount from one, feeds into the starting state of the CABAC engine's range (ivlCurrRange), value (ivlOffset), and a 6-bit bit shifter 68 data subset of the next context bin decoder 72. The entire context buffer would be implemented using flip-flops, to allow C read accesses per cycle, some of whose addresses would be late-arriving. Accordingly, combinational context forwarding of the MPS and LPS PSTATE from one "context bin decoder" to the next is provided, if the selected context indices happened to match between them.

In such implementation, the final bin values returned by the entropy decoding engine 64 may be muxed between the context and bypass decoding paths based on the type of bin command. Further, the updated ivlCurrRange, updated ivlOffset, and total bit-shift amount for that bin command may be muxed based on the type of "bin command" as well as based on the requested number of requested bins (which would determine which stage in the appropriate chain to tap them from, or tap the last additive term from in the case of the bit-shift).

However, these enhancements to the parsing process may include long timing paths that may limit the operational clock frequency of the circuit 60. First, aside from the ivlCurrRange/ivlOffset chaining between consecutive context bin decoders 66, there is a longer timing path arising from the fact that during a string of coeff_abs_level_greater1_flag syntax elements, each bin decode is dependent on the processing of the previous decoded bin by the syntax FSM 62.

This is best illustrated by the example where if C=2. For a string of coeff_abs_level_greater1_flag syntax elements, the context index for the 2nd such flag depends on the decoded bin value of the 1st such flag, as per the references to "the last invocation of the process specified in this subclause" in section "9.3.4.2.6 Derivation process of ctxInc for the syntax element coeff_abs_level_greater1_flag" of the HEVC standard. This dependency would be implemented in hardware using a 2-bit "trailing zeros count" accumulator as part of the "syntax FSM", which initializes to 1 for each coded 4×4 sub-block, saturates at 3, clears to 0 if a coeff_abs_level_greater1_flag is decoded as 1, and otherwise increments by 1 for each coeff_abs_level_greater1_flag is decoded as 0. This leads to timing paths through the first context bin decoder 66 in the entropy decoding engine 64, back to logic in the syntax FSM 62 to update the "trailing zeros count" based on the bin value and thus determine the context index for the second bin, and then back to the second context bin decoder 66 in the entropy decoding engine 64.

Further, due to shared logic resources, even longer timing paths coupling single-context-bin, multi-context-bin, and even bypass-bin specific logic across the syntax FSM 62 and the entropy decoding engine 64 may be observed. Most of these would be false timing paths that could be constrained as such in the synthesis, place & route, and static timing analysis tools, such that the design is not optimized or checked for completing these paths in a single clock cycle. However, this may be risky when implementing non-reprogrammable IC's, because in the process of constraining a large family of timing paths as false, some true paths may accidentally get constrained as false.

As an example of a false path in the naïve multi-context-bin enhancement to the parser, consider a state in the syntax FSM 62 that can only issue a request to decode a single context bin, and uses several levels of combinational logic to determine the context index necessary for that bin decode. This combinational logic could nonetheless show up at the beginning of a timing path that goes through not one, but all C serial context bin decoders 66 (where the 2nd through Cth context bin decoders are part of a true timing path only in states such as the "coeff_abs_level_greater1_flag" multi-bin parsing state, which may in fact have its first context index coming out of flip-flops). The timing path could even go through logic specific to a third type of state after that (e.g., a state which in fact sends a bin command requesting bypass bins (note that a bypass bin is decoded in fewer levels of logic than a context bin), and then uses many levels of combinational logic on the returned bin(s)). This cross-coupling between states of the syntax FSM 62 is caused by overloading the first context index on the bin command interface 70 across single-context-bin and multi-context-bin commands, by sharing the first context bin decoder 66 in the chain and by overloading the decoded bin values returned to the syntax FSM 62 across single-context-bin, multi-context-bin, and bypass-bin commands.

To address the long paths caused by the shared resources and thereby reduce the number of logic levels in the critical timing path, the entropy decoding engine 64 logic for multi-bin CABAC decode can be separated out from the logic for single-bin CABAC decode. Specifically, rather than a design where the syntax FSM 62 muxes the single-bin context index with the first multi-bin context index, the bin command interface 70 may be modified to have separate wires for those functionalities. The entropy decoding engine 64 can then also have a dedicated context bin decoder 66 for single-context-bin commands; this adds negligible logic area compared to the overall area of an HEVC decoder.

Furthermore, the context buffer lookup portion of the multi-context bin's first context bin decoder 66 can then be specialized to support only the 104 out of 173 CABAC contexts associated with the 4 multi-context-bin syntax elements discussed above (e.g., the last_sig_coeff_x_prefix, last_sig_coeff_y_prefix, coeef_abs_level_greater1_flag, and sig_coeff_flag syntax elements). This smaller read mux is realistically faster in a physical implementation. Also, the decoded single-context-bin value could also be provided on a separate physical wire, compared to the first of the decoded multi-context-bin values, and the decoded bypass-bin value(s) could be provided on yet another set of physical wires.

Figure 8:
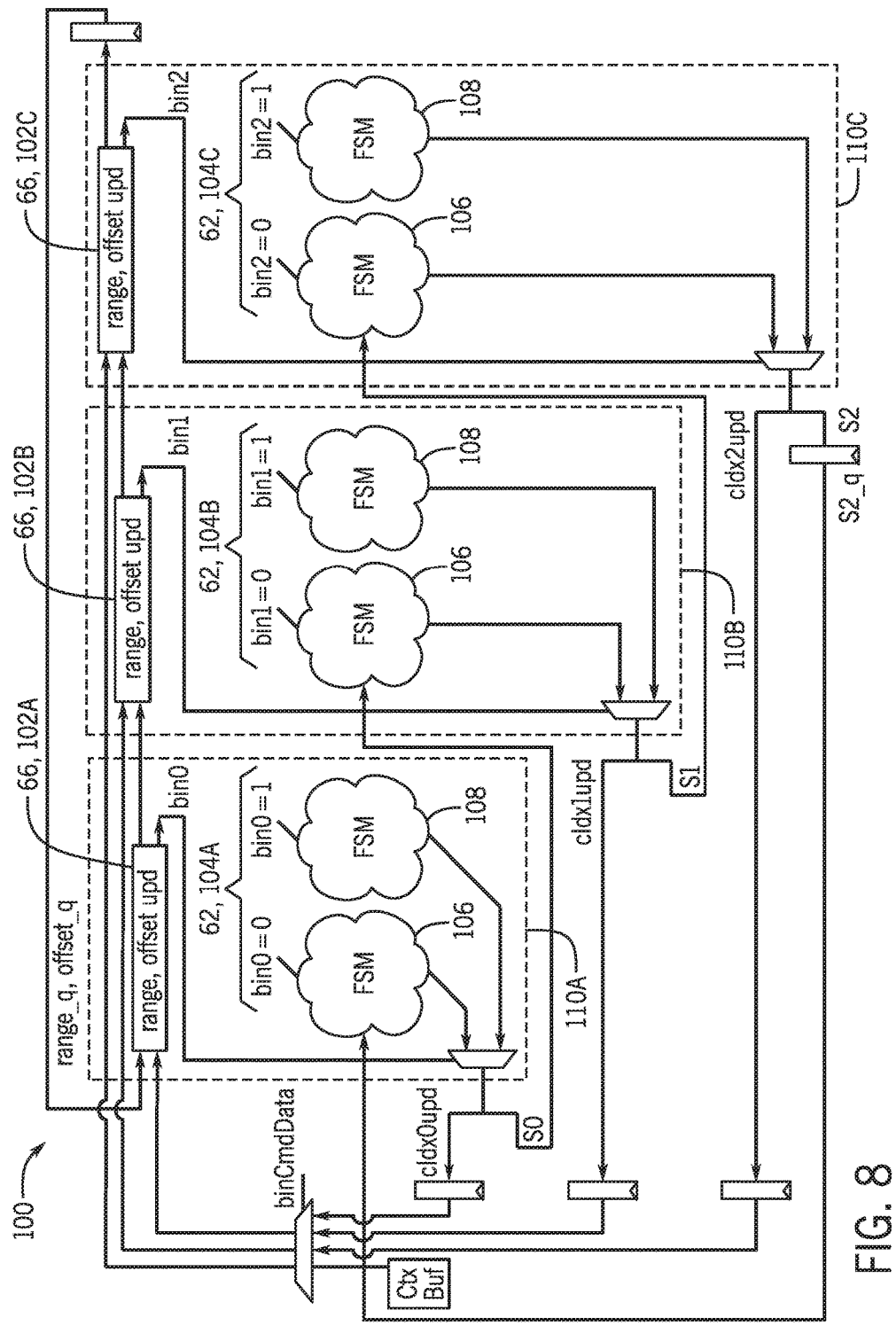
FIG. 8 is block diagram illustrating a parsing process decoupled from a multi-bin decoding process, in accordance with an embodiment of the present disclosure.

FIG. 8 is a block diagram illustrating an embodiment of decoding circuitry 100 that may be used to efficiently decode encoded data by replicating a portion of the syntax FSM 62 for C=3. As illustrated, the decoding circuitry 100 includes 3 context bin decoders 102A, 102B, and 102C. Each of the context bin decoders 102A, 102B, and 102C are labeled "range, offset upd" to indicate that their critical timing path goes through muxing and arithmetic operations on the ivlCurrRange and ivlOffset, in order to decide the bin value.

The sub-FSM 104A, 104B, and 104C interpret bins that belong to the critical syntax elements (e.g., the last_sig_coeff_x_prefix, last_sig_coeff_y_prefix, coeef_abs_level_greater1_flag, and sig_coeff_flag syntax elements). Each of these sub-FSM 104A, 104B, and 104C may include replicated logic that enable the sub-FSM 104A, 104B, and 104C to largely run in parallel with their corresponding context bin decoders 102A, 102B, or 102C, respectively. Within each sub-FSM 104A, 104B, and 104C pair, one FSM 106 is replicated logic that assumes a bin value of 0 and one FSM 108 is replicated logic that assumes a bin value of 1. While the FSMs 106 and 108 may involve different logic, the pairs of sub-FSMs 104A, 104B, and 104C may be identical across all 3 stages 110A, 110B, and 110C.

Each pair in the sub-FSMs 104A, 104B, and 104C assumes a particular value of the bin (0 or 1) and accordingly computes the next parsing state S0, S1, or S2, respectively. Further, in the case where the 2nd and 3rd context indices depend on the 1st and 2nd bin values, respectively, each pair in the sub-FSMs 104A, 104B, and 104C computes the next context index (cIdx0upd, cIdx1upd, and cIdx2upd, respectively). The actual bin value drives a mux select later in the timing path, shortening the total serial timing path through the sub-FSM's 104A, 104B, and 104C.

Figure 9A:
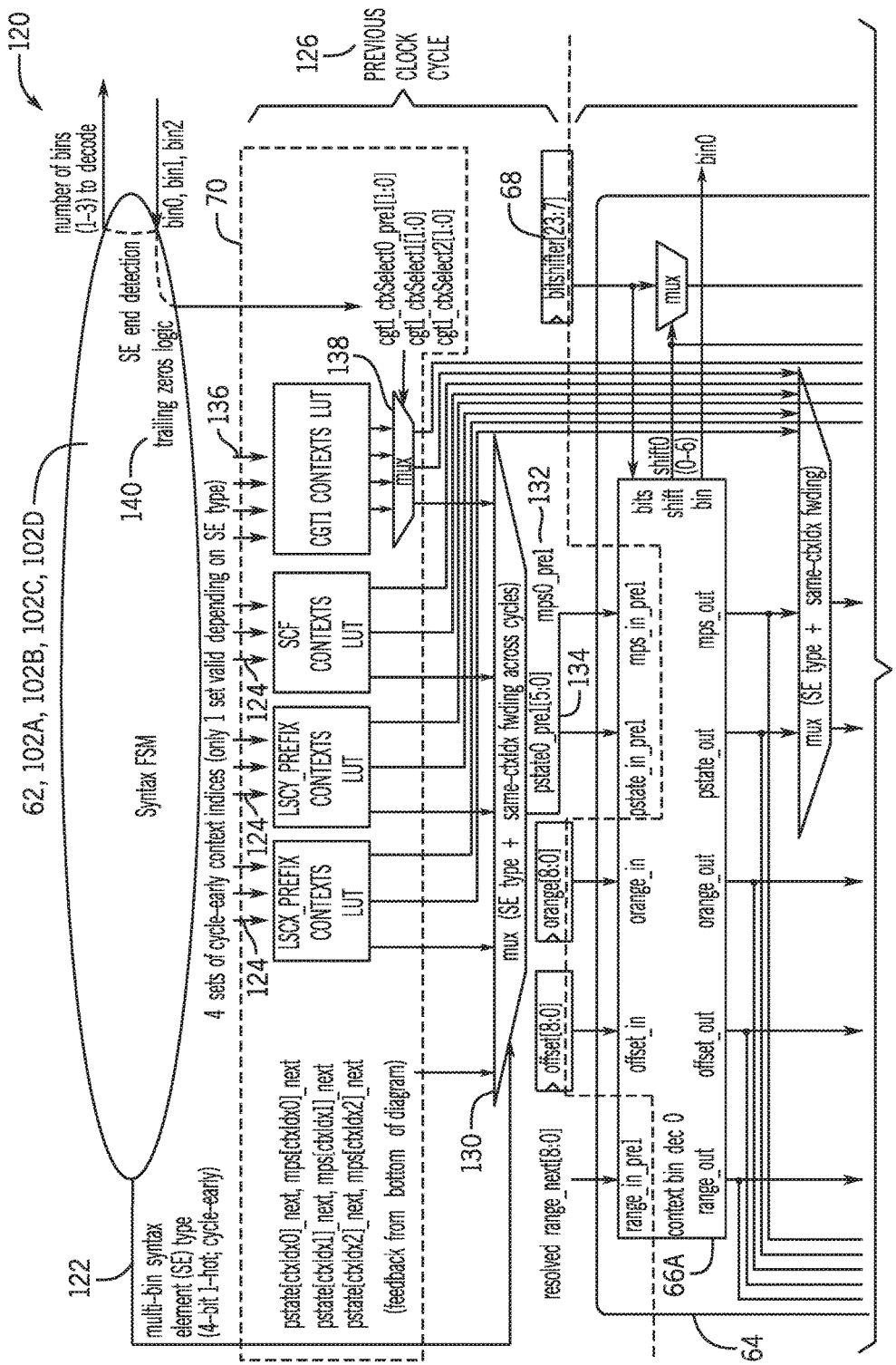
FIGS. 9A and 9B (collectively referenced as "FIG. 9") are a block diagram illustrating an overview of a multi-context-bin decoding path, in accordance with an embodiment of the present disclosure.
Figure 9B:
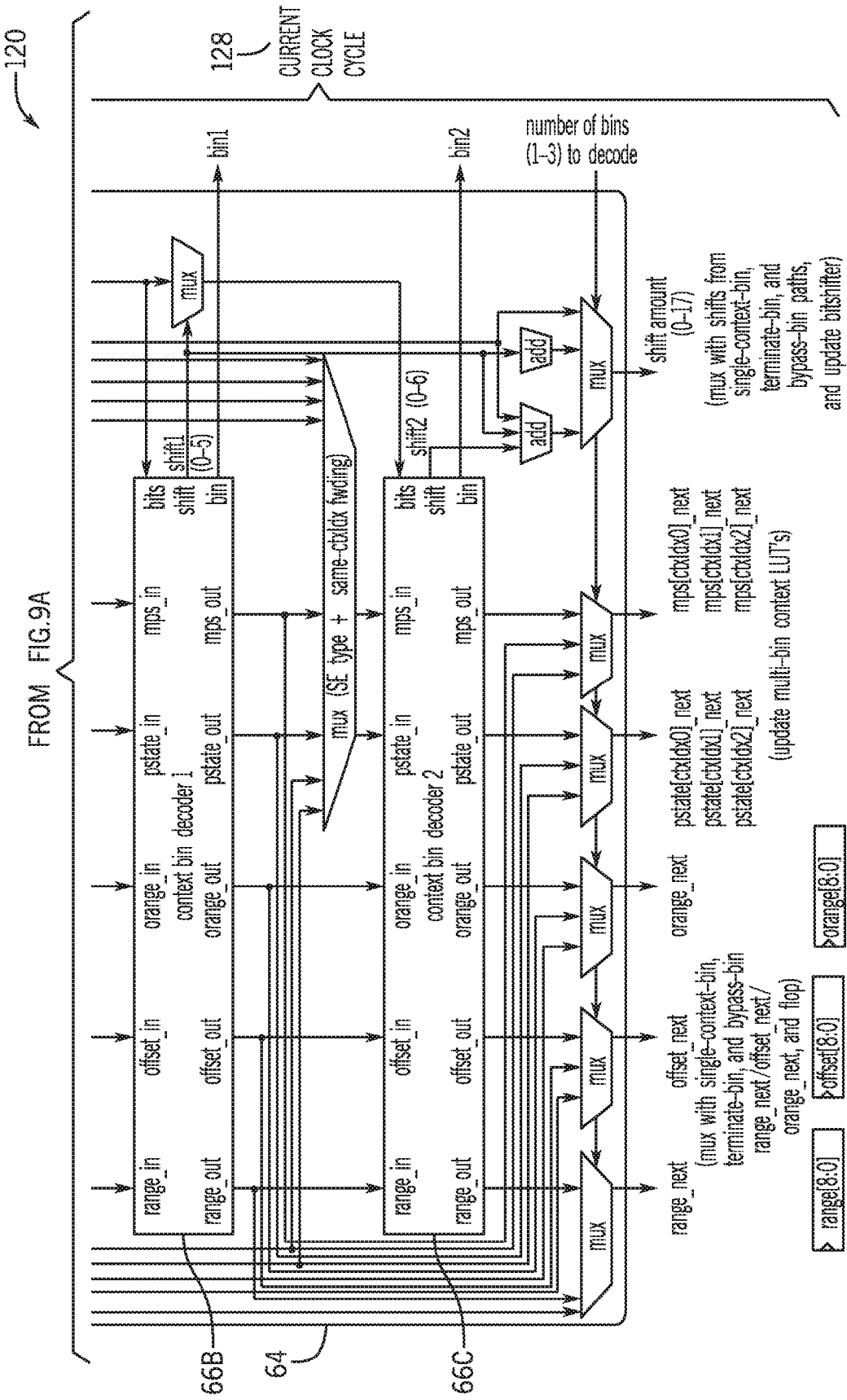

Turning now to additional enhancements for multi-context-bin decoding, FIG. 9 is a block diagram illustrating a multi-context-bin decoding logic path 120, in accordance with an embodiment of the present disclosure. As discussed above, the multi-context-bin decoding logic path 120 includes a Syntax FSM 62, which includes each of the sub-FSM 104A, 104B, 104C, and 104D pairs of FSMs 106 and 108. In brevity, each of the four critical syntax elements (e.g., the last_sig_coeff_x_prefix, last_sig_coeff_y_prefix, coeef_level_greater1_flag, and sig_coeff_flag syntax elements) are denoted as follows in FIG. 9: "LSCX_PREFIX" is short for last_sig_coeff_x_prefix, "LSCY_PREFIX" is short for last_sig_coeff_y_prefix, "SCF" is short for sig_coeff_flag, and "CGT1" is short for coeff_abs_level_greater1_flag. Further, "orange" is short for the difference between ivlOffset minus ivlCurrRange.

In some embodiments, the syntax FSM 62 may pre-determine the indications used to decode a string of multi-context-bins of a particular type in the next cycle. This adds 1 wire 122 to the bin command interface 70 for each of last_sig_coeff_x_prefix, last_sig_coeff_y_prefix, coeff_abs_level_greater1_flag, and sig_coeff_flag syntax elements. If a certain portion of the syntax FSM 62 that handles the syntax elements under residual_coding( ) (section 7.3.8.11 of the HEVC standard), including the 4 chosen multi-context-bin syntax elements, is implemented as a one-hot state machine, then these early indications are various bits of the unflopped version of the one-hot state variable.

Further, in some embodiments, the syntax FSM 62 may also pre-determine the corresponding context indices 124 for bins of the 3 syntax elements last_sig_coeff_x_prefix, last_sig_coeff_y_prefix, and sig_coeff_flag. This pre-determination may be concurrent to the syntax FSM 62 interpreting earlier bins in the bin stream. Alongside each early indication mentioned above, a corresponding set of C early context indices would then be added to the bin command interface 70, alongside the C existing (non-early) context indices. A set of 3C specialized context buffer lookups may then be performed (as represented by the LSCX_PREFIX CONTEXTS LUT, the LSCY_PREFIX CONTEXTS LUT, and the SCF CONTEXTS LUT), still a cycle early (e.g., in previous clock cycle 126, as opposed to current clock cycle 128). A multiplexer 130 may mux out the MPS 132 and LPS PSTATE 134 from the set of contexts relevant to that syntax element type. Specifically, there may be 18 context buffer entries to pre-mux from for last_sig_coeff_x_prefix, 18 for last_sig_coeff_y_prefix, and 44 for sig_coeff_flag. The useful 3C MPS's and 3C LPS PSTATE's may be read for use in the next cycle (e.g., current clock cycle 128), and thus remove all context buffer lookup logic from each of the C chained context bin decoders 66 (66A, 66B, and 66C). The pre-determination may also account for context forwarding across cycles (e.g., from the previous clock cycle 126 to the current clock cycle 128), where if context indices match across cycles, the pre-muxed data for the next cycle may be pre-empted by one of the updated contexts from the current clock cycle 128.

Further, for the coeff_abs_level_greater1_flag syntax element, parallel speculative lookups may be used to minimize the back-and-forth timing paths between the entropy decoding engine 64 and the syntax FSM 62. There are 4 possible context increments that can occur for this syntax element in a given cycle depending on the decoded bin values (see the Min(3, greater1Ctx) additive term in the expression for ctxInc in HEVC standard section "9.3.4.2.6 Derivation process of ctxInc for the syntax element coeff_abs_level_greater1_flag"). Using this insight, 4 more context indices 136 may be added to the bin command interface 70 for early versions of the possibilities, plus an additional (4-C) context indices (only if 4>C) for non-early versions of the candidates (to be used in conjunction with the C existing general-purpose slots for multi-bin context indices). Then, a look up can be performed for the 4 early candidates a cycle before the actual context bin decodes they will be used for, using a set of C specialized context buffer lookups, as represented by the CGT1 CONTENTS LUT. A multiplexer 138 may pre-mux out the MPS and LPS PSTATE from the set of 24 contexts relevant to coeff_abs_level_greater1_flag.

The C actual MPS's and LPS PSTATE's for the next cycle, will either come from this set of 4 pre-muxed values or will come from context forwarding from the previous cycle. In the non-forwarding case, a set of C 4→1 multiplexers are used for mapping. The multiplexers' respective selects are versions of the trailing zeros count maintained by trailing zeros logic 140 in the syntax FSM 62 that precede each individual coeff_abs_level_greater1_flag bin decode. Thus, C "trailing zeros counts" also need to be added to the bin command interface 70, as illustrated by the output from the trailing zeros logic 140. To produce these, the syntax FSM 62 can replicate a small amount of logic 2*C times such that each replica assumes a particular previous bin (out of the 1st through (C−1)th coeff_abs_level_greater1_flag bins to be decoded in that clock cycle) to have taken a particular value (0 or 1). This allows the relevant syntax FSM 62 logic to go in parallel with the corresponding context bin decode 66, as shown in FIG. 8.

Context forwarding between coeff_abs_level_greater1_flag bins decoded in the same cycle (which overrides the pre-muxed and flopped MPS and LPS PSTATE) is triggered by equality between the 2-bit "trailing zeros count" preceding a given bin, and the 2-bit "trailing zeros count" preceding a previous bin within the chain of C bins. (This is smaller and faster than comparing full 8-bit indices into the 173-entry "context buffer".) To speed up the first context bin decode 66A (illustrated in more detail in FIG. 10) in the chain, the syntax FSM 62 can send the entropy decoding engine 64 a 1-cycle early version of the trailing zeros count (adding an additional trailing zeros count to the bin command interface 70) that accounts for any coeff_abs_level_greater1_flag bins decoded in the previous cycle. This early version can be used to pre-resolve between the 4 candidates for the MPS and LPS PSTATE used for the first context bin decode of the next cycle.

Additional logic may be moved to the previous clock cycle 126 to shorten the timing paths corresponding to all 4 of the multi-context-bin syntax elements. For example, the 4-way resolution between the pre-muxed MPS's and LPS PSTATE's corresponding to the 4 multi-context-bin syntax elements (where the one for coeff_abs_level_greater1_flag is itself a resolution between 4 candidates based on the early "trailing zeros count) may be moved to the previous clock cycle 126. Further, for the first context bin decode (e.g., by decoder 66A) in the chain, the Least Probable Symbol Range Table lookup (rangeTabLps) (Lrange LUT 164 of FIG. 10) (Table 9-46 of the HEVC Standard) and the state transition table lookup (transIdxLps) (Lstate LUT 170 of FIG. 10) (Table 9-47 of the HEVC Standard) may be moved to the previous clock cycle 126.

The retiming to move logic a cycle early is beneficial to the critical path delay because it pulls the next cycle's context lookups, as well as the next cycle's first context bin's rangeTabLps lookup in parallel with the current cycle's bit shifter 68 update, which is itself a significant portion of what turns out to be the critical path in a naïve multi-context-bin implementation.

In one embodiment where C=3 and the bit shifter 68 width is 24 bits (with a variable shift amount of 0-17 bits specified to the bit shifter 68 in each cycle by the entropy decoding engine 64), this retiming causes the critical path to be a feedback path that both starts and ends at flip-flops storing the early result of the rangeTabLps lookup. Once the critical path is a feedback path such as this one, further retiming may not further improve the critical path delay.

Given that this retiming scheme moves all of the context buffer lookups to the previous cycle, in some embodiments, the context buffer may be implemented using a synchronous multiport register file macro possessing max(4,C) read ports (where the 4 would be to accommodate the 4 possibilities for the "trailing zeros count" for coeff_abs_level_greater1_flag) and C write ports, rather than implementing the context buffer using flip-flops.

FIG. 10 is a block diagram illustrating details of the first context bin decoder 66A of FIG. 9, in accordance with an embodiment of the present disclosure. As mentioned above, portions of the decoding process performed by the first context bin decoder 66A may be implemented in an earlier pipeline stage (e.g., the previous clock cycle 126). FIG. 10 illustrates the first context bin decoder 66A having flip-flops that enable early variable computation in the pipeline. For example, in the current embodiment of first context bin decoder 66A includes an Lrange flip-flop 160 and an Lshift flip-flop 162, each set according to data from the Lrange LUT 164. Additionally the first context bin decoder 66A includes a pstate_in flip-flop 166 (e.g., for the probability state input) and the sLPS flip-flop 168, set according to data in the Lstate LUT 170. Additionally, an MPS flip-flop 172 receives a most probable symbol input from the previous clock cycle 126.

In contrast to first context bin decoder 66A of FIG. 10, which preloads certain data, the second/third context bin decoder 66B and/or 66C depicted in FIG. 11, performs each step in the same step. Accordingly, as illustrated in FIG. 11, the flip-flops (e.g., Lrange flip-flop 160, Lshift flip-flop 162, pstate_in flip-flop 166, and the sLPS flip-flop 168) are removed, simplifying the hardware for second and third context bin decoders 66B and 66C.

Figure 12:
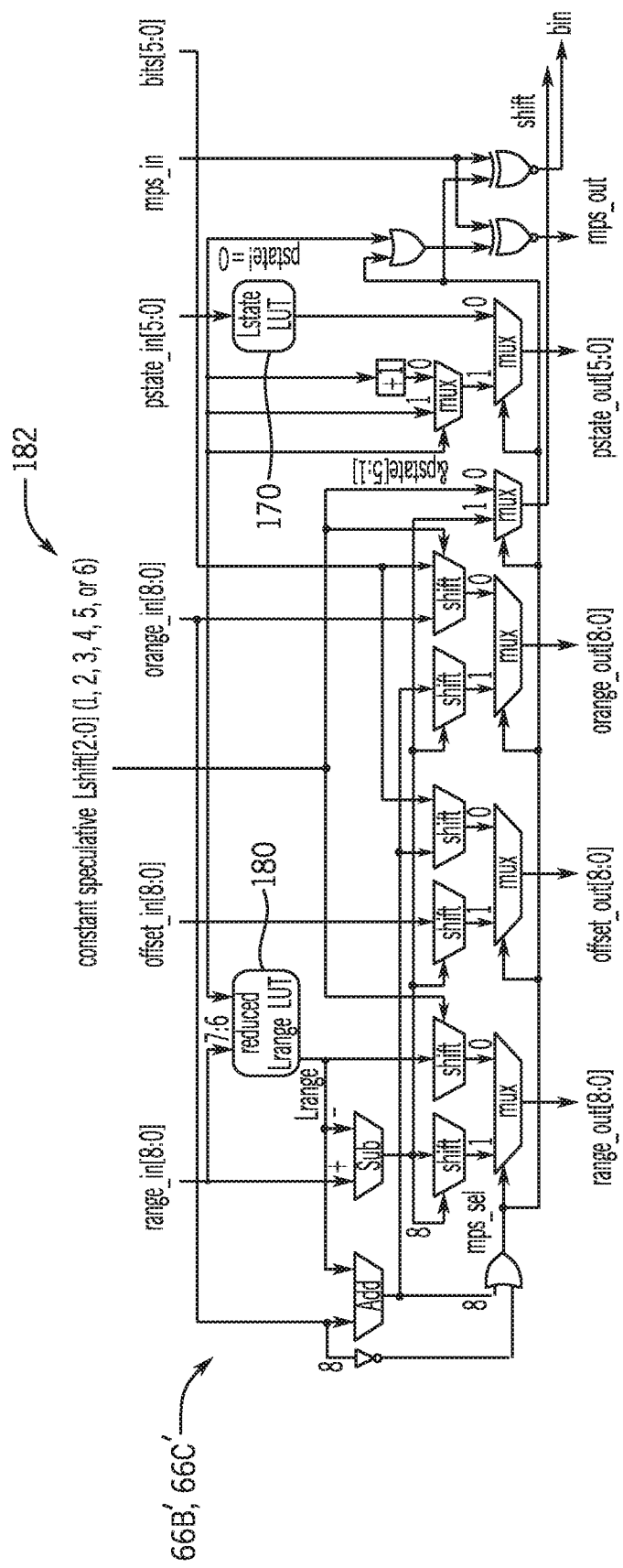
FIG. 12 is a block diagram illustrating details of the second and third context bin decoders of FIG. 9, in accordance with an embodiment of the present disclosure.

FIG. 12 is a block diagram illustrating details of alternative second and third context bin decoders 66B' and 66C' of FIG. 9, in accordance with an embodiment of the present disclosure. Additional enhancements may be achieved in the microarchitecture of the entropy decoding engine 64 by replicating each context bin decoder 66 in the chain up to 6 times (with the possible exception of the first one whose rangeTabLps lookup is retimed to the previous clock cycle) to assume different possible renormalization shift amounts in the case of an LPS decode. This allows other logic in each context bin decoder 66 to proceed without waiting for the actual renormalization shift amount, which is equal to 1 more than the number of MSB zero bits in the 8-bit unsigned representation of the rangeTabLps lookup result. In particular, the rangeTabLps lookup 180 shrinks down to only the subset of possibilities that are consistent with the hardwired number of MSB zero bits. The determination of the actual shift amount may be performed in parallel with add/subtract and mux logic, which was otherwise downstream. The actual renormalization shift amount then drives the select lines of final 6→1 muxes on the bin value, updated MPS, updated LPS PSTATE, ivlCurrRange, ivlOffset, and bitstream shift amount from that context bin decoder 66 stage in the chain. This modification generally adds logic area (unless it enhances performance of the circuit sufficiently, such that other logic in the same timing path can be implemented in a much more area-efficient way), while aiding timing closure.

If the circuit is implemented this way, then in FIG. 9, context bin decoder 1 66B and context bin decoder 2 66B may each be replicated 6 times in parallel, and a separate Lrange LUT 182 corresponding to each set of 6 replicas may compute, in parallel with the replicas, the actual Lshift amount which will activate the mux select to resolve between the outputs of the 6 replicas.

Avoidance of long timing paths ending at nearly every state flip-flop in the syntax FSM 62 (including those that have nothing to do with multi-context-bin decode), by having the entropy decoding engine 64 drive the Ready signal on the bin command interface 70 based on whether the bit shifter 68 contains enough valid bits to handle a worst-case shift-out for the chosen value of C (which is not necessarily 6*C, though it is 6 for C=1), rather than based on whether the bit shifter 68 contains enough valid bits to handle the actual shift-out as determined by a complex function of the combined state of the syntax FSM 62 and entropy decoding engine 64.

The Ready signal on the bin command interface 70 can be decoupled from many bits will actually be shifted off by the current cycle of bin decoding (which would bring the serial context bin decodes into the timing path). Instead, it can be based on the OR of 2 cases: either the bit shifter 68 may contain (i) a number of bits greater than or equal to the worst-case bit shift from a single bin command or (ii) the last bit of the bitstream, or at least of the portion that may call upon the entropy decoding engine 64 (i.e. the final slice segment). While this modification results in the syntax FSM 62 being stalled in certain cases where it could proceed (thus increasing the number of cycles required to finish decoding the stream), those cases are avoided in a system where the write side of the bit shifter 68 has bandwidth to replenish any bytes that the entropy decoding engine 64 has shifted out. In such a system, this modification improves the bits per second decoding performance by increasing the clock frequency at which the circuit can operate.

The worst-case bit shift referred to in (i) typically comes from decoding the unlikeliest possible sequence of C context bins, unless that is exceeded by the number of bypass bins that the design decodes per cycle (in which case that number will be the worst-case bit shift, since each bypass bin corresponds to one bitstream bit). Assuming the worst-case bit shift comes from the context bin decode path, it is not necessarily equal to 6*C bits, even if all C bins decoded in a clock cycle are decoded as the maximally unlikely symbol values. This fact may assist in the logic implementation of the bit shifter 68. For example if C=3, the worst-case bit shift can be reached by parsing the last_sig_coeff_x_prefix for a 4×4 transform, with unique context indices for the 3 bins (otherwise decoding the first LPS would cause a subsequent LPS to be less unlikely and hence shift off fewer bits). If we have the following "perfect storm" to shift out as many bits as possible: ivlCurrRange=0x139 (e.g., qRangeIdx=0), ivlOffset=ivlCurrRange−1, the LPS PSTATE of all 3 context indices is 62 (the state representing the lowest possible probability of the LPS), and the LPS is decoded for all 3 bins (if the 3 MPS's are 0, then a bin string of 111 means a debinarized value of 3 in this case, as per Table 9-38 of the HEVC standard).

Then, during the first bin decode, the rangeTabLps lookup returns its smallest possible value of 0x6, so ivlCurrRange is 0x133 which less than ivlOffset (0x138) after binVal is set equal to 1 minus valMps, ivlOffset is decremented by ivlCurrRange, and ivlCurrRange is set equal to ivlLpsRange (e.g., according to section 9.3.4.3.2.1 of the HEVC standard, when ivlOffset is greater than or equal to ivlCurrRange). Otherwise, when the variable binVal is set equal to valMps (e.g., according to section 9.3.4.3.2.1), ivlOffset is 0x5 and ivlCurrRange is 0x6. Then after renormalization (section 9.3.4.3.3 of the HEVC standard) shifts out 6 bits from the bitstream to get ivlCurrRange up to at least 0x100, ivlCurrRange is 0x180 (i.e. qRangeIdx=2) and ivlOffset is 0x17f if all 6 bits were 1.

During the second bin decode, the rangeTabLps lookup returns 0x8, so ivlCurrRange is 0x178 which less than ivlOffset (0x17f) after: binVal is set equal to 1 minus valMps, ivlOffset is decremented by ivlCurrRange, and ivlCurrRange is set equal to ivlLpsRange (e.g., according to section 9.3.4.3.2.1 of the HEVC standard, when ivlOffset is greater than or equal to ivlCurrRange). Otherwise, when the variable binVal is set equal to valMps (e.g., according to section 9.3.4.3.2.1 of the HEVC standard), ivlOffset is 0x7 and ivlCurrRange is 0x8. Then after renormalization (section 9.3.4.3.3 of the HEVC standard) shifts out 5 bits from the bitstream to get ivlCurrRange up to at least 0x100, ivlCurrRange is 0x100 (i.e. qRangeIdx=0) and ivlOffset is 0xff if all 5 bits were 1.

During the third bin decode, the rangeTabLps lookup returns its smallest possible value of 0x6, so ivlCurrRange is 0xfa which less than ivlOffset (0xff) after the first part of item 2 of section 9.3.4.3.2.1 of the HEVC standard. After the second part of item 2 of section 9.3.4.3.2.1, ivlOffset is 0x5 and ivlCurrRange is 0x6. Then after renormalization (section 9.3.4.3.3) reads 6 "1" bits from the bitstream to get ivlCurrRange up to at least 0x100, ivlCurrRange is 0x180.

Thus for C=3, the bit shifter 68 need not support a shift amount of 18 bits coming from the entropy decoding engine 64; it only needs to support shift amounts of 0-17 bits. For C=2, it only needs to support shift amounts of 0-11 bits (not 12). This type of design constraint relaxation can marginally speed up the critical path (which goes through the barrel-shift logic of the bit-shifter 68, whose delay increases with the number of supported shift amounts).

Accordingly, the technical effects of the present disclosure include facilitating improved output rate of encoded image data, for example, to facilitate real-time or near real-time display and/or transmission. In particular, output rate may be improved by providing multi-bin decoding in parallel. For example, in some embodiments, parallel processing may be used by decoupling at least a portion of the arithmetic decoding of context bins from syntax element parsing. Additionally, in some embodiments, pipeline timing may be implemented to reduce a critical path, resulting in higher operating frequency of the decoding circuitry.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device comprising a video decoding pipeline configured to decode encoded source image data, wherein the video decoding pipeline comprises:
   one or more syntax finite state machines, configured to control parsing of one or more syntax elements of the encoded source image data;
   one or more entropy decoding engines, comprising one or more context bin decoders, the one or more context bin decoders configured to arithmetically decode bits of the encoded source image data;
   wherein the one or more syntax finite state machines comprise:
      a first sub-finite state machine (first sub-FSM) that assumes a first output from the one or more context bin decoders and computes a first context index update and a first next state in parallel with a current processing operation associated with the one or more context bin decoders; and
      a second sub-finite state machine (second sub-FSM) that assumes a second output from the one or more context bin decoders and computes a second context index update and a second next state in parallel with the current processing operation associated with the one or more context bin decoders; and
   wherein, upon completion of the current processing operation associated with the one or more context bin decoders, a selection between the first context index update and the second context index update and between the first next state and the second next state is determined based upon the bits of the encoded source image data that are arithmetically decoded.

2. The electronic device of claim 1, wherein:
   the selection between the first context index update and the second context index update is configured to drive a subsequent arithmetic decoding process of the one or more context bin decoders.

3. The electronic device of claim 1, comprising:
   a second syntax finite state machine wherein the selection between the first next state and the second next state of a first syntax finite state machine is provided to the second syntax finite state machine.

4. The electronic device of claim 3, comprising:
   a third syntax finite state machine wherein the selection between the first next state and the second next state of the second syntax finite state machine is provided to the first syntax finite state machine.

5. The electronic device of claim 4, wherein:
   the first syntax finite state machine, the second syntax finite state machine, and the third syntax finite state machine, in conjunction with corresponding first, second, and third context bin decoders, are configured to decode three context bins in parallel.

6. The electronic device of claim 1, configured to decode multiple context bins per clock cycle.

7. The electronic device of claim 6, configured to:
   decode the multiple context bins per clock cycle for only a subset of frequently occurring context adaptive binary arithmetic coded (CABAC) coded syntax elements.

8. The electronic device of claim 7, wherein the CABAC coded syntax elements comprise:
   a last_sig_coeff_x_prefix syntax element that specifies a prefix of a column position of a last significant coefficient in a scanning order;
   a last_sig_coeff_y_prefix syntax element that specifies a prefix of a row position of the last significant coefficient in the scanning order;

a coeef_abs_level_greater1_flag syntax element that indicates whether coefficients are greater than 1; and a sig_coeff_flag syntax element that indicates a significance of the coefficients.

9. The electronic device of claim 1, wherein:

at least one of the one or more syntax finite state machines is configured to pre-determine a set of indications used to decode of a string of multi-context-bins of a particular type in a next clock cycle; and a first context bin decoder of the one or more context bin decoders is configured to use the set of indications from a previous clock cycle in a current clock cycle.

10. The electronic device of claim 9, wherein:

the set of indications are pre-stored in one or more flip-flops of first context bin decoder in the current clock cycle.

11. The electronic device of claim 1, configured to perform a Least Probable Symbol Range Table (rangeTabLps) lookup corresponding to a first bin decoder of the one or more context bin decoders in a previous clock cycle, prior to use in a current clock cycle.

12. A logic circuit for parsing an encoded bitstream, comprising:

a syntax finite state machine comprising one or more sub-finite state machines; and an entropy decoding engine comprising a bin decoder configured to operate in parallel with processing operations of the one or more sub-finite state machines respective bin based at least in part on assuming an output of the bin decoder;

wherein, for a set of critical syntax elements, the syntax finite state machine and the entropy decoding engine are configured to increase throughput of the logic circuit by processing multiple context adaptive binary arithmetic coded (CABAC)-encoded bins per clock cycle.

13. The logic circuit of claim 12, comprising:

a number C of chained context bin decoders; and a bin command interface, comprising C bins to be decoded and C context indices;

wherein the entropy decoding engine is configured to return C bin values to the syntax finite state machine.

14. The logic circuit of claim 13, wherein:

a context buffer is implemented using flip-flops, allowing C read accesses per clock cycle.

15. The logic circuit of claim 13, wherein the bin command interface comprises separate wires for providing a single-bin context index and a first multi-bin context index.

16. The logic circuit of claim 13, wherein the number C of chained context bin decoders comprise a first context bin decoder configured to perform a context buffer lookup using a 1-cycle-early version of a state of the syntax finite state machine.

17. A set of context bin decoders of an entropy decoding engine, comprising:

a first bin decoder configured to perform a context buffer lookup using a 1-cycle-early version of a state of a syntax finite state machine, wherein the first bin decoder is configured to process the 1-cycle-early version of the state of the syntax finite state machine parallel to one or more processing operations based on an assumed output from the first bin decoder.

18. The set of context bin decoders of claim 17, wherein a context buffer for the context buffer lookup is implemented using a synchronous memory macro and wherein the context buffer lookup is performed in a previous clock cycle relative to a current clock cycle where a context bin is decoded using the 1-cycle-early version of the state of the syntax finite state machine.

19. The set of context bin decoders of claim 17, wherein a context buffer for the context buffer lookup is implemented using one or more registers, an asynchronous-read memory macro, or both and wherein the context buffer lookup is performed in a beginning of a current clock cycle where a context bin is decoded using the 1-cycle-early version of the state of the syntax finite state machine.

20. The set of context bin decoders of claim 17, comprising:

a set of replicated bin decoders wherein the set of replicated bin decoders are used to assume each possible renormalization shift amount, enabling other portions of the set of context bin decoders to proceed without waiting for an actual computed renormalization shift amount.

* * * * *